United States Patent
McMullin et al.

(10) Patent No.: US 7,702,306 B2
(45) Date of Patent: Apr. 20, 2010

(54) APPARATUS AND METHOD FOR LOCAL OSCILLATOR CALIBRATION IN MIXER CIRCUITS

(75) Inventors: Donald G McMullin, Laguna Hills, CA (US); Ramon A Gomez, San Juan Capistrano, CA (US); Lawrence M Burns, Laguna Hills, CA (US); Myles Wakayama, Laguna Miguel, CA (US)

(73) Assignee: Broadcom Corporation, Irvine, CA (US)

( * ) Notice: Subject to any disclaimer, the term of this patent is extended or adjusted under 35 U.S.C. 154(b) by 163 days.

(21) Appl. No.: 10/649,807

(22) Filed: Aug. 28, 2003

(65) Prior Publication Data

US 2005/0048939 A1 Mar. 3, 2005

(51) Int. Cl.
*H04B 17/00* (2006.01)
(52) U.S. Cl. ............... 455/226.1; 455/67.11; 455/307; 455/255
(58) Field of Classification Search ............ 455/209, 455/180.1, 182.3, 183.1, 183.2, 67.11–67.14, 455/313–334, 307, 226.1–226.4, 255–265; 348/731, 732
See application file for complete search history.

(56) References Cited

U.S. PATENT DOCUMENTS 3,641,515 A 2/1972 Sues (Continued)

FOREIGN PATENT DOCUMENTS

| EP | 0208470 A2 | 1/1987 |
|---|---|---|
| EP | 0473373 A2 | 3/1992 |
| EP | 0576082 A1 | 12/1993 |
| EP | 0883237 A1 | 12/1998 |
| WO | WO99/16179 | 4/1999 |

OTHER PUBLICATIONS

Aschwanden, "Direct Conversion—How To Make It Work in TV Tuners," *IEEE Transactions on Consumer Electronics*, vol. 42, No. 3, Aug. 1996, pp. 729-738.

(Continued)

*Primary Examiner*—Lana N Le
(74) *Attorney, Agent, or Firm*—Sterne, Kessler, Goldsteom & Fox P.L.L.C.

(57) ABSTRACT

An apparatus and method for local oscillator calibration compensates for filter passband variation in a mixer circuit, such as a receiver circuit. The receiver includes at least a mixer circuit and a filter coupled to the output of the mixer. During operation, the mixer mixes an RF input signal with a first local oscillator (LO) signal to frequency translate a selected channel in the RF input signal into the passband of the filter. During a calibration mode, the RF input signal is disabled, and the first LO signal is injected into the filter input by leaking the first LO signal through the mixer circuit. The frequency of the LO signal is then swept over a frequency bandwidth that is sufficiently wide so that the actual passband is detected by measuring the signal amplitude at the output of the bandpass filter, thereby determining any variation in the passband of the filter from the expected passband. Once the actual passband is determined, then the frequency of the first local oscillator signal is adjusted or tuned to compensate for any frequency shift of the actual passband compared to the expected passband. Therefore, the selected channel is up-converted into the center of the actual passband of the bandpass filter and will not fall outside the passband. This enables the passband of the bandpass filter to be narrowed, as compared with conventional receivers that do not utilize this calibration procedure. For example, the bandpass filter can be narrowed to one or two channels wide.

32 Claims, 8 Drawing Sheets

U.S. PATENT DOCUMENTS

| | | | | |
|---|---|---|---|---|
| 4,006,420 | A | 2/1977 | Schittko | |
| 4,031,469 | A | 6/1977 | Johnson | |
| 4,340,975 | A | 7/1982 | Onishi et al. | |
| 4,368,468 | A | 1/1983 | Lisle et al. | |
| 4,696,055 | A | 9/1987 | Marshall | |
| 4,858,159 | A | 8/1989 | Wheelwright et al. | |
| 5,200,826 | A | 4/1993 | Seong | |
| 5,329,319 | A | 7/1994 | Sgrignoli | |
| 5,337,014 | A | 8/1994 | Najle et al. | |
| 5,390,348 | A | 2/1995 | Magin et al. | |
| 5,408,196 | A | 4/1995 | Senpel et al. | |
| 5,584,068 | A | 12/1996 | Nohindra | |
| 5,692,279 | A | 12/1997 | Mang et al. | |
| 5,737,035 | A | 4/1998 | Rotzoll | |
| 5,822,687 | A * | 10/1998 | Bickley et al. | 455/226.1 |
| 5,847,612 | A | 12/1998 | Birleson | |
| 5,930,696 | A | 7/1999 | Tzuang et al. | |
| 5,950,119 | A | 9/1999 | McGeehan et al. | |
| 6,009,317 | A | 12/1999 | Wynn | |
| 6,011,962 | A | 1/2000 | Lindenmeier et al. | |
| 6,028,647 | A | 2/2000 | Fukai et al. | |
| 6,035,186 | A | 3/2000 | Moore et al. | |
| 6,037,999 | A | 3/2000 | Kunishima | |
| 6,160,572 | A | 12/2000 | Matsuura | |
| 6,163,684 | A | 12/2000 | Birleson | |
| 6,169,569 | B1 | 1/2001 | Widmer et al. | |
| 6,233,442 | B1 | 5/2001 | Koda et al. | |
| 6,330,290 | B1 * | 12/2001 | Glas | 375/324 |
| 6,427,068 | B1 | 7/2002 | Suominen | |
| 6,484,042 | B1 | 11/2002 | Loke | |
| 6,591,091 | B1 * | 7/2003 | Vorenkamp et al. | 455/179.1 |
| 6,678,012 | B1 * | 1/2004 | Belotserkovsky | 348/731 |
| 6,714,263 | B2 * | 3/2004 | Cowley | 348/731 |
| 6,952,564 | B2 | 10/2005 | Gannholm | |
| 6,954,625 | B2 * | 10/2005 | Cowley | 455/259 |
| 6,970,689 | B2 * | 11/2005 | Khorram | 455/326 |
| 6,983,136 | B2 * | 1/2006 | Mason et al. | 455/307 |
| 7,051,781 | B2 * | 5/2006 | Grimm et al. | 160/265 |
| 7,054,602 | B2 * | 5/2006 | van der Pol | 455/67.11 |
| 7,299,021 | B2 * | 11/2007 | Perssinen et al. | 455/226.1 |
| 7,437,139 | B2 * | 10/2008 | Lo et al. | 455/307 |
| 2003/0157902 | A1 * | 8/2003 | Khorram | 455/85 |
| 2003/0171110 | A1 * | 9/2003 | Shi et al. | 455/324 |
| 2003/0176174 | A1 * | 9/2003 | Seppinen et al. | 455/226.1 |
| 2004/0002318 | A1 * | 1/2004 | Kerth et al. | 455/255 |
| 2004/0137870 | A1 * | 7/2004 | Kivekas et al. | 455/326 |
| 2005/0069056 | A1 * | 3/2005 | Willingham | 375/327 |

OTHER PUBLICATIONS

Ducourant et al., "A 3 Chip G&As Double Conversion TVTuner System With 70 dB Image Rejection," *IEEE 1989 Microwave and Millimeter—Wave Monolithic Circuits Symposium*, pp. 87-90, copyright, 1989.

Farmer, "Specifications for Tuner Design for Use in Cable Ready Television Receivers and VCRs," *IEEE Transactions on Consumer Electronics*, vol. 36, No. 3, Aug. 1990, pp. 660-668.

Maas, "Microwave Mixers," Artech House, Copyright, 1986, pp. 248-251.

* cited by examiner

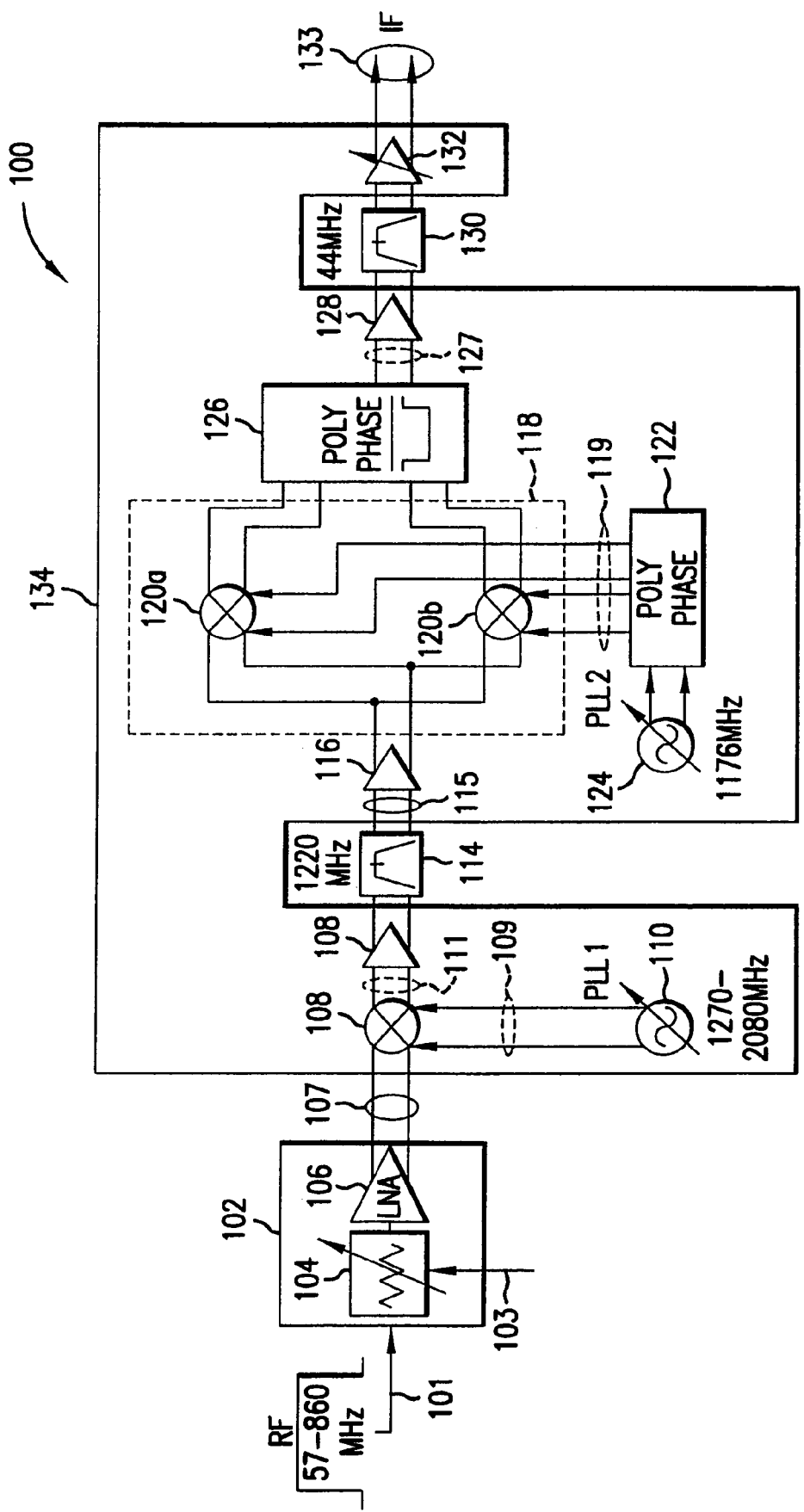
FIG. IC

APPARATUS AND METHOD FOR LOCAL OSCILLATOR CALIBRATION IN MIXER CIRCUITS

BACKGROUND OF THE INVENTION

1. Field of the Invention

The present invention generally relates to tuner calibration, and more specifically to calibrating a local oscillator signal to compensate for variation in the filter passband response of a channel selection filter in a dual conversion tuner.

2. Background Art

Television signals are transmitted at radio frequencies (RF) using terrestrial, cable, or satellite transmission schemes. Terrestrial and cable TV signals are typically transmitted at frequencies of approximately 57 to 860 MHZ, with 6 MHZ channel spacings in the United States and 8 MHz channel spacing in Europe. Satellite TV signals are typically transmitted at frequencies of approximately 980 to 2180 MHz.

Regardless of the transmission scheme, a tuner is utilized to select and down-convert a desired channel from the TV signal to an intermediate frequency (IF) signal or a baseband signal, which is suitable for processing and display on a TV or computer screen. The tuner should provide sufficient image rejection and channel selection during down-conversion as is necessary for the specific application. The National Television Standards Committee (NTSC) sets standards for television signal transmission, reception, and display. To process a NTSC signal, it is preferable that the tuner have a high-level of image rejection. However, less image rejection is acceptable for non-NTSC signals depending on the specific application and the corresponding display requirements.

To achieve a high level of image rejection, traditional TV tuners utilize a dual-conversion architecture having two mixers and at least one surface acoustic wave (SAW) filter. The first mixer up-converts the received RF signal to a first IF frequency (e.g. 1200 MHZ) that is fixed above the RF signal band of the incoming TV signal, using a variable local oscillator (LO) signal. A SAW filter, centered at the first IF, selects the channel of interest and provides the image rejection to prevent signal interference. The second mixer then down-converts the first IF to a lower frequency second IF, using a second fixed frequency LO signal. The second IF output is at baseband for a NTSC compatible signal. Alternatively, the second IF is at 36 or 44 MHZ for a cable system output that is fed into a set-top box or a cable modem. Channel selection is realized by adjusting the first LO signal so that the desired channel is up-converted into the passband of the SAW filter, and is then down-converted to baseband by the second mixer.

The accuracy of the channel selection in the dual conversion tuner is dependent on the accuracy of the passband of the SAW filter. If the passband of the SAW filter varies because of manufacturing tolerances, temperature variations, etc., then the accuracy of the channel selection will suffer. For example, if the passband varies from that intended, then a portion or all of the desired channel may fall outside the SAW passband, causing unwanted signal attenuation in the desired channel.

A conventional method to address the passband tolerance of the SAW filter is to simply increase the passband so as to pass a larger number of channels than is necessary. For instance, SAW filters for TV tuners can be designed to have a passband of 4 or more channels, so as compensate for variation in the passband tolerance. The larger SAW passband improves the likelihood that the desired channel will be up-converted into the SAW filter passband, but also means that one or more undesired channels will also be passed. These unwanted channels can cause signal distortion in the down-conversion stage that requires additional filtering at baseband to correct.

What is needed is a method or apparatus for calibrating the dual conversion tuner (or other type of receiver) for the passband tolerances of the SAW filter, so that the passband can be narrowed to pass approximately only 1 or 2 channels.

BRIEF SUMMARY OF THE INVENTION

The present invention is an apparatus and method for local oscillator calibration in mixer circuits. For example, a dual conversion receiver can include a first mixer, a second mixer, and a bandpass filter coupled between the first mixer and the second mixer. The dual conversion receiver receives an RF input signal having a plurality of channels and down-converts a selected channel to baseband or to a low frequency IF signal.

During operation of a dual conversion receiver, the first mixer mixes the RF input signal with a first local oscillator signal to up-convert the RF input signal and generate a first IF signal. The bandpass filter selects a desired channel from the first IF signal that is within its narrow passband window, and substantially rejects all of the remaining channels. Therefore, a particular channel is selected by varying the frequency of the first local oscillator signal so that the desired channel is up-converted into the narrow passband of the bandpass filter. The second mixer then mixes the output of the bandpass filter with a second local oscillator signal to down-convert the selected channel to baseband, or to a low frequency second IF signal.

During a calibration mode, the RF input signal is disabled so that the actual passband of the bandpass filter can be determined using the first local oscillator signal. The first local oscillator signal is injected into the input port of the bandpass filter either directly or indirectly. Since, the first local oscillator signal is coupled to the first mixer, the first local oscillator signal will leak through the first mixer to the input port of the bandpass filter when the RF signal is disabled. Therefore, the first local oscillator signal can be swept over frequency and the actual passband of the bandpass filter can be determined by measuring the signal level output of the bandpass filter. The actual passband may differ from the expected passband due to manufacturing tolerances or changes caused by temperature variation. In other words, the passband may be shifted in frequency from that which was expected.

Once the actual passband is determined, then the frequency of the first local oscillator signal is adjusted or tuned to compensate for any frequency shift of the actual passband verses the initial expectation. Therefore, the selected channel is up-converted into the center of the actual passband of the bandpass filter and will not fall outside the passband. This enables the passband of the bandpass filter to be narrowed, as compared with conventional receivers that do not utilize this calibration procedure. For example, the bandpass filter can be narrowed to one or two channels wide.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 1C illustrates a dual conversion tuner with local oscillator calibration and including image rejection.

DETAILED DESCRIPTION OF THE INVENTION

Figure 1A:
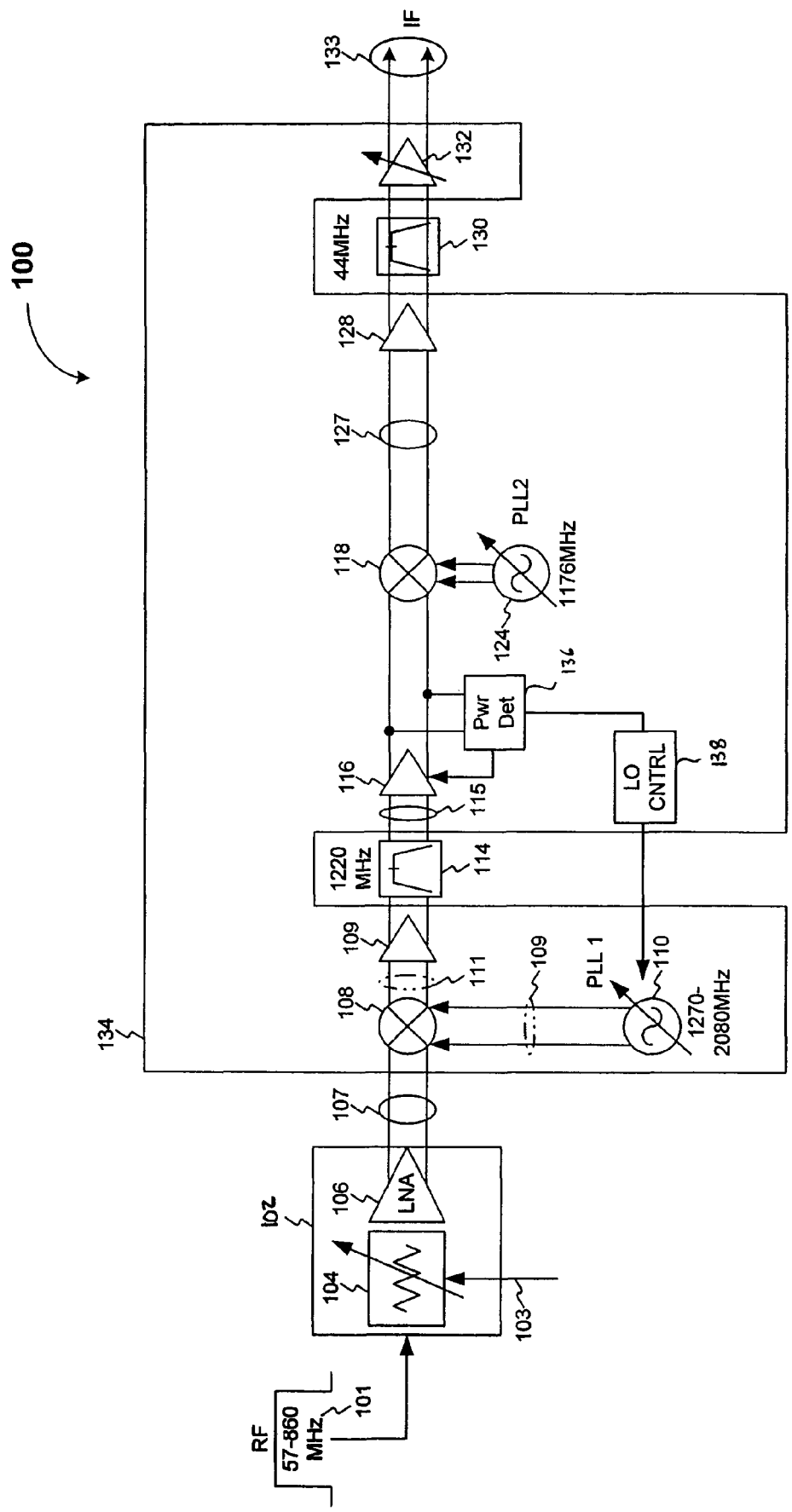
FIG. 1A illustrates a dual conversion tuner with local oscillator calibration to compensate for filter passband variation.

FIG. 1A illustrates a schematic of a tuner assembly 100 that has an automatic gain control circuit (AGC) 102 and a tuner 134 that includes a filter calibration apparatus and method for detecting and compensating for filter passband variation.

The tuner assembly 100 receives an RF input signal 101 having multiple channels and down-converts a selected channel to an IF frequency, to produce an IF signal 133. For instance, the RF input signal 101 can include multiple TV channels that typically have 6 MHZ frequency spacings and cover a range of 54-860 MHZ, and where the selected channel is down-converted to an IF frequency at 44 MHZ, 36 MHZ or some other desired IF frequency for further processing. The structure and operation of the tuner assembly 100 are described in further detail below.

The AGC circuit 102 provides automatic gain control using a variable resistor 104 and a low noise amplifier (LNA) 106. The variable resistor 104 attenuates the RF input signal 101 according to a control signal 103. In embodiments, the control signal 103 is based on the signal amplitude of the IF signal 133 so that the RF front-end gain can be adjusted to achieve a desired amplitude for the IF signal 133. The LNA 106 provides low noise amplification and converts a single-ended input signal to a differential RF signal 107.

The tuner 134 has a dual conversion architecture (one up-conversion, and one down-conversion) that includes an up-convert mixer 108 and a down-convert mixer 118. The up-convert mixer 108 is driven by a first phase locked loop (PLL) 110 that has coarse tuning capability from 1270-2080 MHz. The down-convert mixer 118 is driven by a second PLL 124 that has a relatively fixed frequency of 1176 MHZ (for a 44 MHZ IF) and has fine frequency tuning capability. Two separate off-chip surface acoustic wave (SAW) filters 114 and 130 are used to perform IF filtering in the tuner 134. However, other bandpass filters besides SAW filters could be used for the filters 114 and 130 as will be understood by those skilled in the arts. The first SAW filter 114 is connected between the up-convert mixer 108 and the down-convert mixer 118. The passband of the SAW filter 114 is centered at 1220 MHZ, and is preferably only a few channels wide (e.g. 1-2 channels wide or 12 MHZ for 6 MHZ TV channel spacings), and can be referred to as a channel selection filter. The second SAW filter 130 has a passband at 44 MHZ and is coupled to the output of the amplifier 128. Additionally, various on-chip amplifiers 112, 112, 128, and 132 are included throughout the tuner 134 to provide signal amplification, as necessary. The amplifier 116 is a variable gain amplifier controlled by a power detector 136 so as to provide automatic gain control as will be discussed further below. The power detector 136 can also be called a signal detector or just a detector, and the VGA 116 and the power detector 136 can be referred to as an automatic gain control.

Figure 1B:
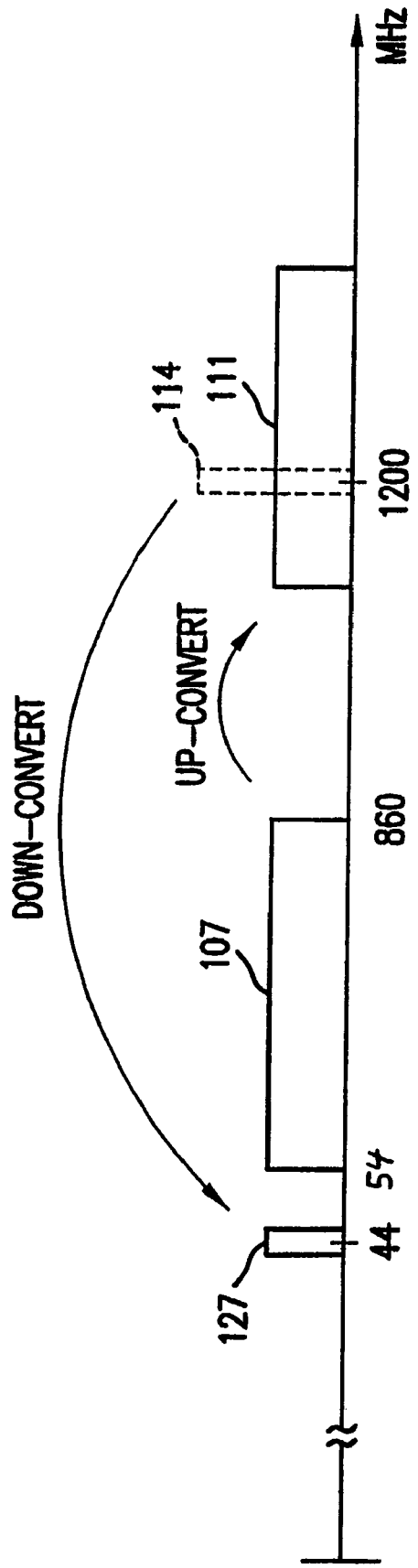
FIG. 1B further illustrates the channel selection of the dual conversion tuner.

The operation of the tuner 134 is described as follows and in reference to FIG. 1B, where FIG. 1B represents the frequency spectrum of the particular signals that are operated on and generated by the tuner 134. The up-convert mixer 108 mixes the RF signal 107 with a LO signal 109 that is generated by the PLL 110. As discussed above and as shown in FIG. 1B, the RF signal 107 can be a TV signal having a plurality of channels that occupy from 54 MHz to 860 MHz. Since the PLL 110 is tunable from 1270-2080 MHZ, the RF signal 107 is up-converted to a first IF 111 having a frequency that is above the 54-860 MHZ input frequency band. The first IF 111 is sent off-chip to the SAW filter 114, which has a narrow passband window centered at 1220 MHz, as discussed above. The first SAW filter 114 selects a desired channel 115 that is within its narrow passband window, and substantially rejects all of the remaining channels. Therefore, a particular channel is selected by varying the frequency of the LO signal 109 so that the desired channel is up-converted into the narrow passband of the IF filter 114. The desired channel 115 (at 1220 MHZ) is sent back on-chip to the PGA 116, where the PGA 116 and the power detector 136 provide automatic gain control for the selected channel 115. The down-convert mixer 118 mixes the output of the PGA 116 with an LO signal from the PLL 124. The down-convert mixer 118 down-converts the desired channel 115 to an 44 MHZ IF signal 127 that appears at the IF output of the down-convert mixer 118. Finally, the IF signal 127 is filtered a second time by the bandpass SAW filter 130 to reject any unwanted frequency harmonics, producing the output IF signal 133 at 44 MHZ, or some other desired IF frequency or baseband, and carrying the information in the desired channel.

In one embodiment, the down-conversion mixer 118 is an image rejection mixer as shown in FIG. 1C. The image rejection mixer 118 includes two component mixers 120a and 120b and a polyphase filter 126, where the component mixers 120a and 120b are driven by a quadrature LO signal 119 from a polyphase filter 122. The image rejection mixer 118 down-converts the desired channel 116 to the IF signal 127 that appears at the output of the polyphase filter 126, where the I and Q components of the IF signal 127 are combined in the polyphase filter 126 to provide image rejection.

The specific frequencies mentioned in the description of the tuner assembly 100, and throughout this application, are given for example purposes only and are not meant to be limiting. Those skilled in the arts will recognize other frequency applications for the tuner assembly 100 based on the discussion given herein. These other frequency applications are within the scope and spirit of the present invention.

Furthermore, the present invention is not limited to the dual conversion tuner 100, but can be utilized with any mixer or receiver circuit that can benefit from filter characterization and compensation. For instance, the present invention could be implemented with a direct conversion tuner having a single mixer circuit and a filter afterwards.

Furthermore, it is noted that the tuner 100 is configured for differential operation. For instance, the first mixer 108, the bandpass filter 114, the second mixer 118, the first LO signal 109, and the second LO signal 119 are all configured with differential inputs and outputs to reduce signal distortion. However, the present invention is not limited to differential operation, and can be implemented in single ended configurations.

Figure 2:
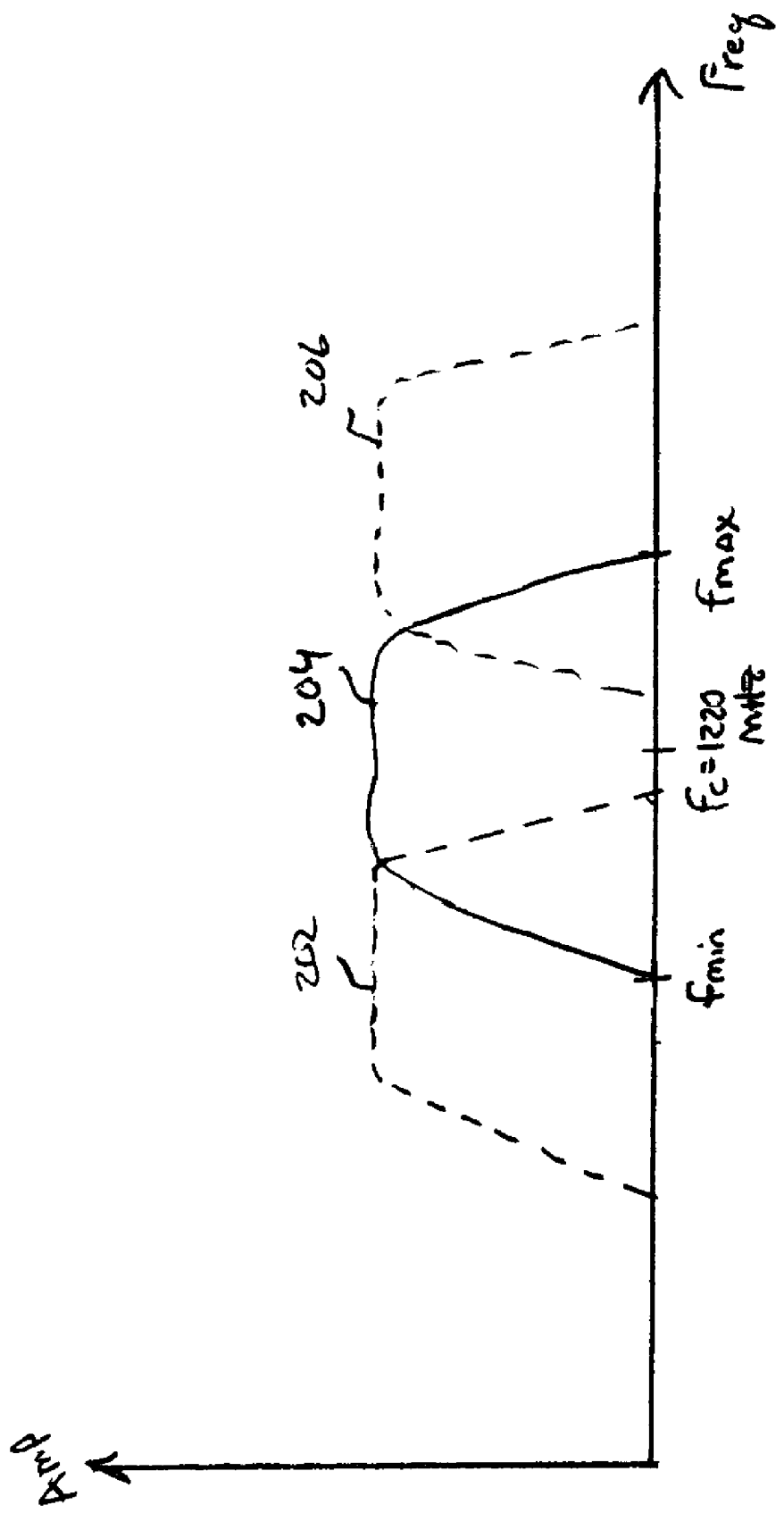
FIG. 2 illustrates filter passband variation.

As discussed above, the filters 114 and 130 are subject to manufacturing tolerances and temperature variations that can cause their respective passbands to shift over frequency. For example, FIG. 2 illustrates a desired (or expected) passband 204 for the filter 114 that is centered on 1220 MHz. However, the actual passband may vary from part-to-part and over temperature, so that the passband is shifted in frequency as represented by the actual passbands 202 and 206. Since the filter passband is only a few channels wide, a small frequency shift can cause the channel at 1220 Mhz to be unexpectedly attenuated if a portion (or all) of the desired channel falls outside the passband of the filter.

Figure 3:
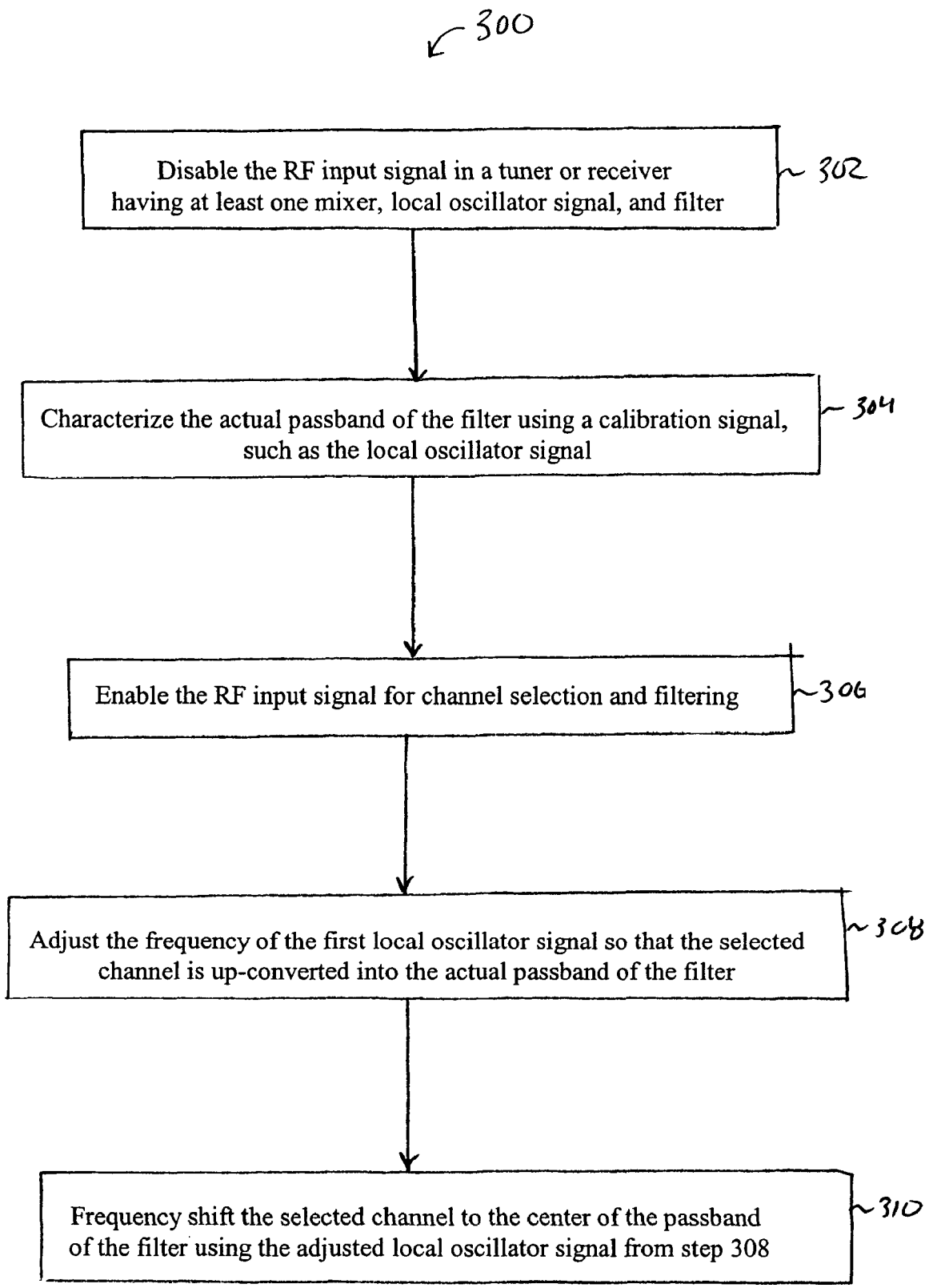
FIG. 3 illustrates a tuner calibration method for compensating for filter passband variation.

As discussed above, the conventional solution used to address the filter tolerance is to simply widen the filter passband, improving the chances that the desired channel at 1220 MHz will pass unattenuated. However, widening the filter passband also passes more undesired channels that can cause distortion and interference in the second down-conversion stage. Accordingly, the present invention characterizes the actual passband of the filter 114 in a calibration period (or mode) prior to channel tuning and down-conversion. In other words, the passband of the filter 114 is characterized with no input RF signal 101 during the calibration mode, so as to detect any passband variations compared to that which was expected (e.g. 1220 MHz in this example). Once the filter passband is characterized, the first PLL 110 is tuned so the desired channel in the IF signal 111 is up-converted to the center of the actual passband of the filter 114, which may or may not be at 1220 Mhz in this example. In other words, if the passband of the filter 114 is frequency shifted from that which was expected, then the PLL 110 is tuned so that the first IF signal 111 compensates for the frequency shift of the filter 114 passband. The filter characterization and compensation in a dual conversion tuner is discussed further below using the flowchart 300 that is shown in FIG. 3.

In step 302, the RF input signal 101 is disabled for the calibration mode. For example, the filter characterization is performed when the RF input signal 101 is not present or is disconnected for channel tuning and selection.

In step 304, the actual passband of the filter 114 is characterized using a calibration signal, such as the first local signal 109. The actual passband of the filter 114 may be stored in a memory device (not shown). The details of the filter characterization will be discussed further with respect to the flowchart 400.

In step 306, the RF input signal 101 is enabled and a selected channel is identified for channel selection and down-conversion. For example, the a LO control 138 can receive a control signal 140 that identifies a channel selection for down-conversion.

In step 308, the frequency of the first local oscillator signal 109 is determined to frequency shift the desired channel into the actual passband of the bandpass filter 114, and includes adjustments to accommodate for any variations in the actual filter passband from the expected filter passband. In other words, the first local oscillator signal is adjusted so that the selected channel is up-converted to the center frequency of the actual passband of the filter 114 by the mixer 108. For instance, assuming the desired channel is at 50 Mhz in the RF signal 101, the PLL 110 would be tuned to generate a local oscillator signal at 1270 MHz, to up-convert the selected channel to a first IF signal of 1220 MHz. However, if the actual passband of the filter 114 was found to be centered at 1222 MHz, then the PLL 110 would be tuned to generate a local oscillator signal 109 at 1272 MHz. In other words, the frequency of the first local oscillator 109 is increased or decreased so that the desired channel is up-converted to the center of the actual passband of the filter 114. Summarized another way, the frequency of the first local oscillator signal is adjusted to accommodate for the actual passband of the filter 114, including tolerance variation that cause the filter passband to change verses the expected passband.

In step 310, the selected channel in the RF input signal is up-converted to the center of the actual passband of the filter 114 using the local oscillator signal 109 that was generated in step 308. For example, the mixer 108 up-converts the selected channel in the RF input signal 101 to the center of the actual passband of the filter 114.

Figure 4:
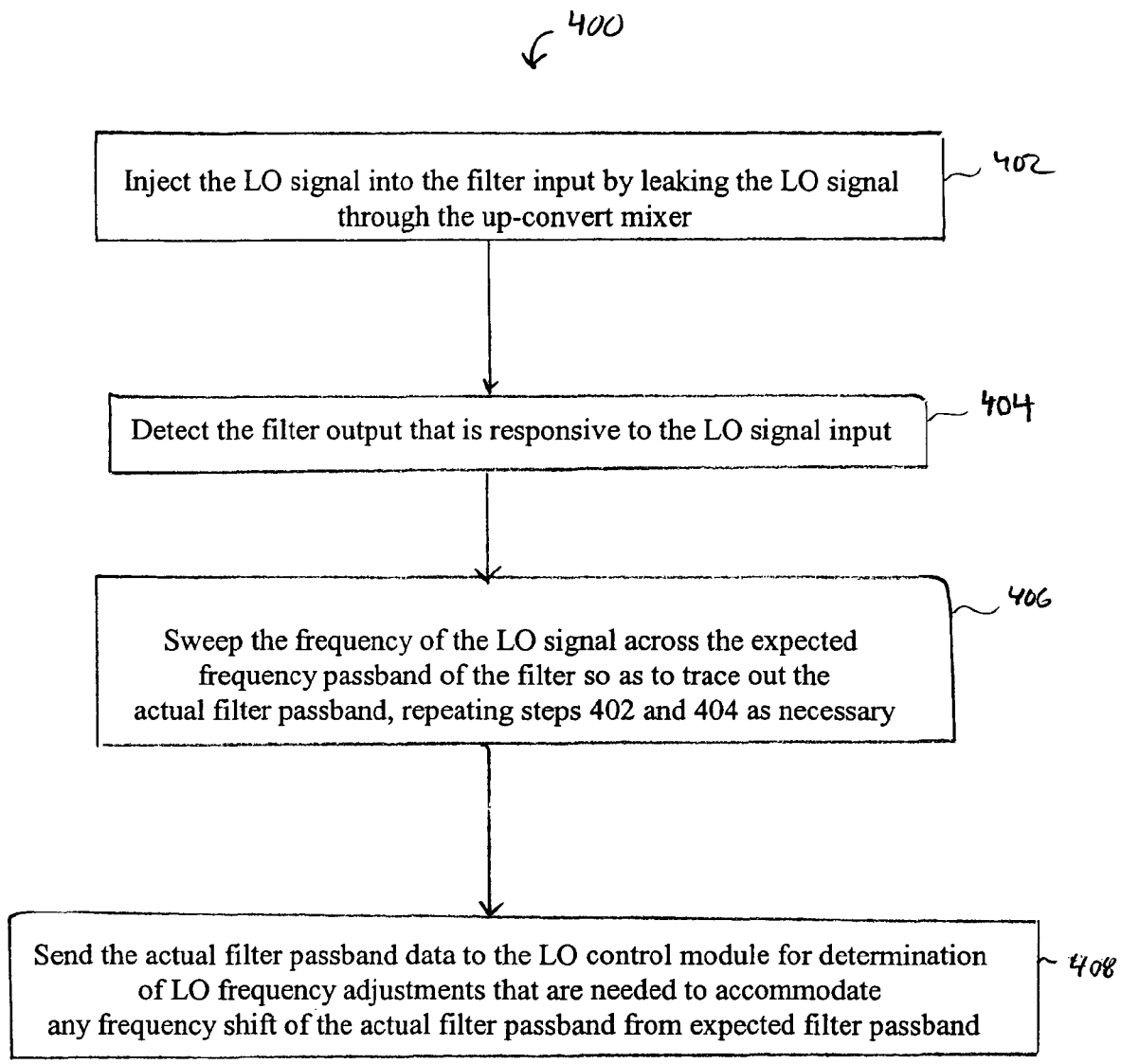
FIG. 4 illustrates a filter characterization method using local oscillator signal injection.

The filter characterization of step 304 is discussed further below using the flowchart 400 that is shown in FIG. 4. The filter 114 passband is characterized by leaking the LO signal 109 through the filter 114 when there is no RF signal input 101. The frequency of the LO signal 109 is varied or swept over frequency so as to trace-out the frequency passband of the filter 114.

In step 402, LO signal 109 is injected into the input of the filter 114 so as to characterize the actual passband of the filter. For example, the mixer 108 will typically leak a portion of the local oscillator signal 109 to its IF port that is connected to the input of the filter 114, where the leakage is characterized by the LO-to-IF isolation. Therefore, the mixer LO leakage can be utilized to inject the first local oscillator signal 109 into the input of the mixer 108. Alternatively, the LO signal 109 can be directly injected into the input of filter 114 using a switch and signal path (not shown) that bypasses the mixer 109 and connects to the input port of the filter 114.

In step 404, the output of the filter 114 is detected or measured responsive to the LO signal 109 that is injected into the input of the filter 114. For example, the power detector 136 can be used to monitor the signal amplitude or power output of the filter 114 responsive to the LO signal 109, the result of which is forwarded to the LO control 138. As discussed above, the power detector 136 also provides feedback for automatic gain control of the programmable gain amplifier 116 signal. In other words, portions of the automatic gain control (AGC) can also be used to measure the signal level at the output of the bandpass filter 114.

Figure 5:
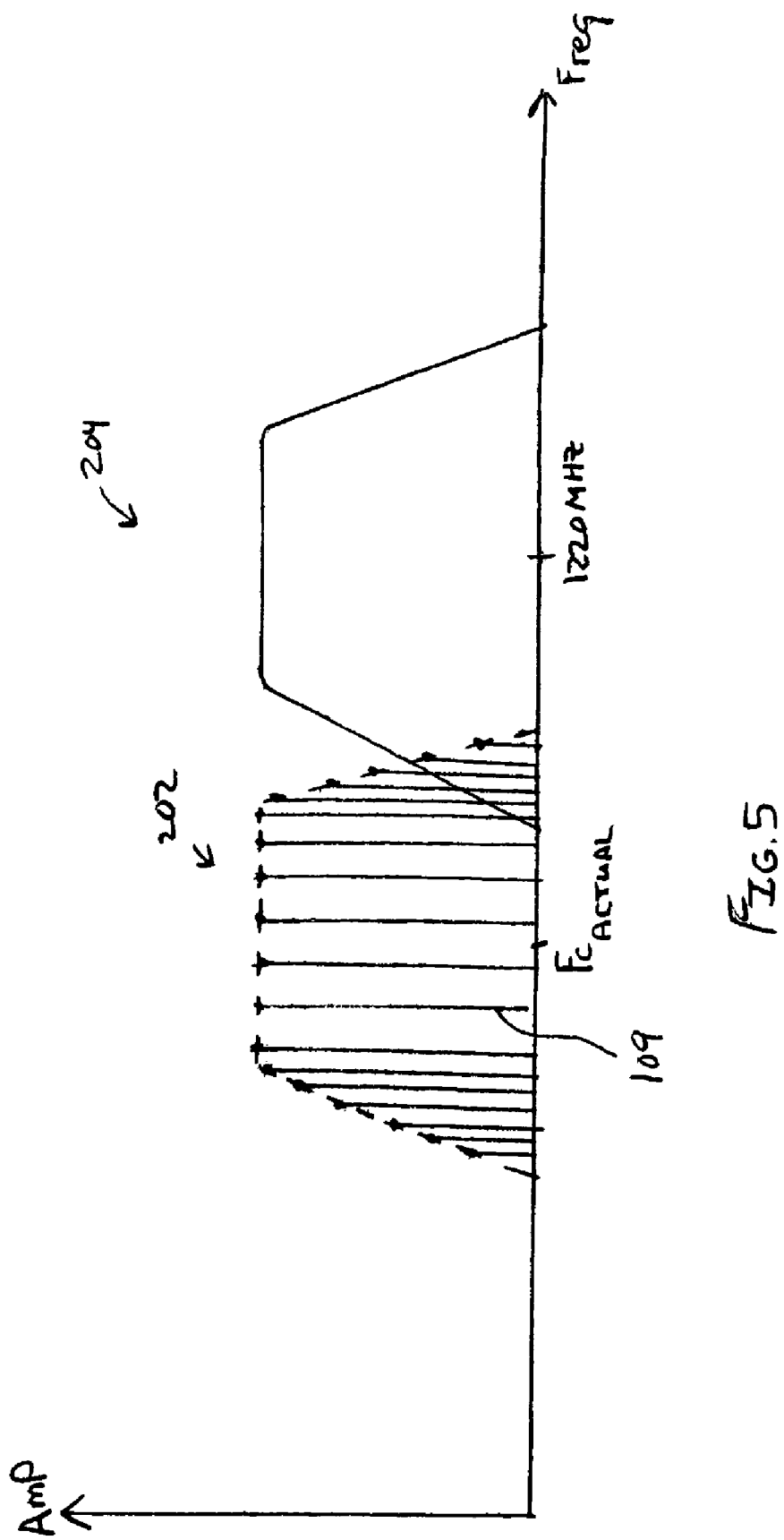
FIG. 5 illustrates actual and expected filter passbands.

In step 406, the frequency of the LO signal 109 is varied to sweep across the actual passband of the filter 114, and steps 402 and 404 are repeated above to trace out the actual passband of the filter as represented by FIG. 5. For instance, the frequency of the LO signal 109 can be swept across the expected passband of the filter, and beyond to detect any shifts in the passband, to trace out the actual passband of the filter.

In step 408, the LO control 138 receives the amplitude output (or signal level output) from the power detector 136 that reflects the actual passband of the filter 114. The LO control 138 determines any adjustments to the PLL 110 as are necessary so that the selected channel is up-converted to the center of the actual passband of the filter 114. In other words, as described in step 308, the frequency of the local oscillator signal 109 is adjusted to account for any shift in frequency of the actual filter 114 passband from the ideal so that the selected channel can be up-converted to the actual filter passband 202 that is shown in FIG. 4. For instance if the selected channel is at 100 MHz in the RF input signal 101, then the LO signal 109 should be set to 1320 MHz, if the filter 114 has a passband that is centered on the ideal value of 1220 MHz. However, if the actual filter passband of the filter 114 is shifted to say 1215 MHz as shown in FIG. 4, then the LO signal 109 should be set to 1315 MHz to up-convert the 100 MHz channel to 1215 MHz. In this manner, the frequency shift of the actual filter 114 passband from expected is accommodated and compensated.

As discussed above, the actual filter bandwidth of the filter 114 is determined by leaking the LO signal 109 in the input of the filter 114, and detecting the filter output with the power detector 136, so as to characterize the actual filter passband of the filter. This may be referred to as a calibration mode since the RF input signal is disabled during this period of filter characterization. Afterwhich, during channel selection and down-conversion, the frequency of the LO signal is adjusted to account for any variation in the actual filter passband from the expected filter passband.

Since the actual filter passband of the filter 114 is determined, the passband of the filter can be significantly narrowed to pass only 1 or 2 channels. This is advantageous because it reduces the number of unwanted channels that are down-converted, thereby reducing distortion and interference during the second down-conversion step.

Figure 6:
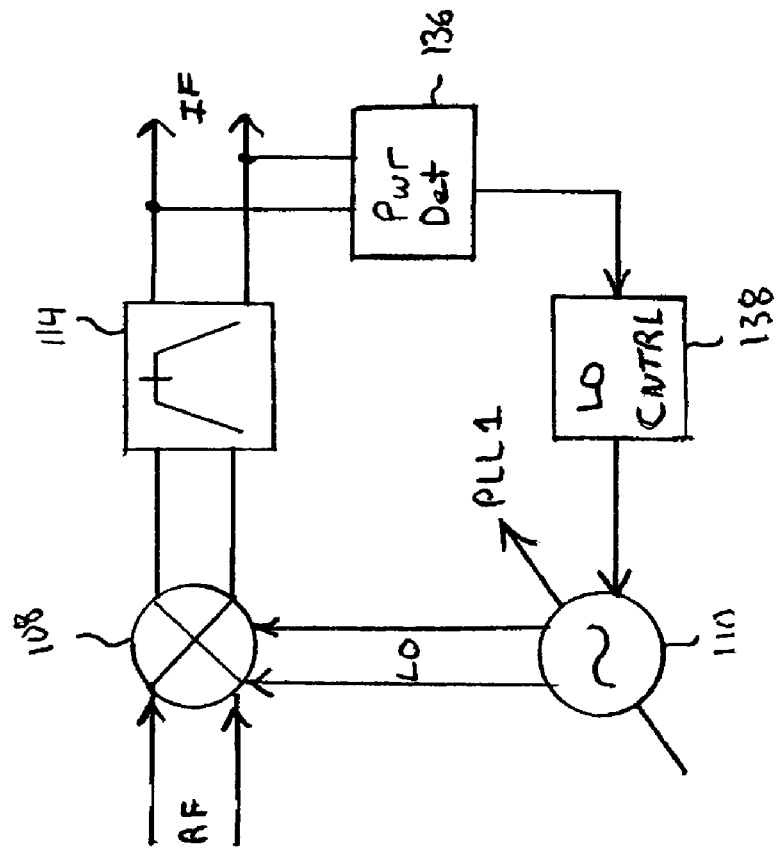
FIG. 6 illustrates a single stage mixer circuit having local oscillator calibration to compensate for filter passband variation.

The invention herein has been described in reference to a dual conversion tuner for the down-conversion and processing of television signals. However, the invention is not limited to this example embodiment, and could be implemented in any receiver. More specifically, the invention could be implemented in any receiver having a filter and local oscillator that could benefit from filter characterization using a local oscillator signal or other calibration signal, and then compensating for any filter variation using the local oscillator signal. For example, FIG. 6 illustrates a single stage mixer circuit 600 having only the first stage components from the dual conversion receiver 100 of FIG. 1A. As discussed above, the LO 110 is swept over frequency during a calibration mode, and the output of the filter 114 is measured to determine the actual passband of the filter 114. Afterwhich, during IF processing, the LO 110 is tuned so as to compensate for any shift in the actual passband of the filter 114 from the expected passband. In other words, the LO 110 is tuned so the desired portion of the RF input signal is frequency converted to an IF frequency that falls in the actual passband of the filter 114, despite any passband variation due to temperature drift, manufacturing tolerances, etc.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. In a receiver having a first mixer, a second mixer, and a bandpass filter coupled between said first mixer and said second mixer, said first mixer responsive to a first local oscillator signal that is coupled to said first mixer and said second mixer responsive to a second local oscillator signal, a method of compensating for passband variation of said bandpass filter, comprising:

disabling an RF input signal applied to an RF port of said first mixer so that said RF port receives no signal input during a calibration mode;
injecting said first local oscillator signal into an LO port of said first mixer;
leaking said first local oscillator signal from the LO port of said first mixer to an IF port of said first mixer that is coupled to an input port of said bandpass filter;
determining an actual passband of said bandpass filter responsive to said first local oscillator signal;
enabling said RF input signal applied to said RF port of said first mixer;
mixing an RF input signal having plurality of channels with said first local oscillator signal after said step of determining to generate a first IF signal, including said step of adjusting a frequency of said first local oscillator signal based upon a selected channel of said plurality of channels and based upon said actual passband of said bandpass filter.

2. The method of claim 1, wherein the step of determining includes the steps of:
sweeping said frequency said first local oscillator signal; and
measuring an output of said bandpass filter responsive said sweeping step, to determine said actual passband of said bandpass filter.

3. The method of claim 1, wherein the step of adjusting said frequency of said first local oscillator signal includes the step of setting a frequency of said first local oscillator signal so said selected channel in said first IF signal falls within said actual passband of said bandpass filter.

4. The method of claim 1, wherein said step of adjusting said frequency includes the step of setting said frequency of said first local oscillator signal so as to compensate for variation of said actual passband of said bandpass filter.

5. The method of claim 4, wherein said variation is caused by a temperature variation of said bandpass filter.

6. The method of claim 4, wherein said variation is caused by manufacturing tolerance variation of said bandpass filter.

7. The method of claim 1, wherein said of step of injecting includes the steps of:
coupling said first local oscillator signal to a local oscillator port of said first mixer when said RF input signal is disabled.

8. The method of claim 7, further comprising the step of leaking said first local oscillator signal through said first mixer to an input port of said bandpass filter.

9. The method of claim 1, wherein said step of mixing includes the step of up-converting said selected channel in said first IF signal into said actual passband of said bandpass filter.

10. The method of claim 9, further comprising the step of filtering said first IF signal so that said selected channel and at most one other channel pass through said bandpass filter.

11. The method of claim 9, further comprising the step of filtering said first IF signal so that only said selected channel passes through said bandpass filter.

12. The method of claim 9, further comprising the step of mixing said selected channel at an output of said bandpass filter with a second local oscillator signal in said second mixer to down-converted said selected channel to baseband.

13. The method of claim 9, wherein said step of mixing said selected channel includes the step of providing image rejection for said selected channel.

14. The method of claim 1, further comprising the step of filtering said first IF signal to generate an output passband that passes said selected channel and at most one other channel.

15. A receiver for processing an RF input signal having a plurality of channels, comprising:
a receiver input configured to receive an RF input signal having a plurality of channels;
a first mixer having a first input coupled to said receiver input and a second input coupled to a first local oscillator signal;
a bandpass filter having an actual passband and an input coupled to an if output of said first mixer; and
a second mixer having an first input coupled an output of the bandpass filter and an second input coupled to a second local oscillator signal;

wherein the actual passband of said bandpass filter is determined by sweeping a frequency of said first local oscillator signal injected into an LO port of said first mixer during a calibration mode, wherein an RF port of said first mixer receives no signal during said calibration mode, wherein said first local oscillator signal leaks from said LO port to said IF output of said first mixer for input into said bandpass filter.

16. The receiver of claim 15, wherein after said calibration mode, said frequency of said first local oscillator is adjusted so that a selected channel of said plurality of channels falls in said actual passband of said bandpass filter that is determined during said calibration mode.

17. The receiver of claim 15, wherein after said calibration mode, said frequency of said first local oscillator signal is adjusted to account for any passband variation so that said selected channel of said plurality of selected channels is up-converted into said actual passband of actual bandpass filter.

18. The receiver of claim 15, further comprising a means for detecting a power output of said bandpass filter responsive to said first local oscillator during said calibration mode, said actual passband determined from said power output.

19. The receiver of claim 18, further comprising a local oscillator control module that receives said power output from said bandpass filter and determines said actual passband of said bandpass filter based on said power output, and controls a frequency of said first local oscillator signal responsive to said actual passband of said actual bandpass filter.

20. The receiver of claim 15, wherein during said calibration mode, said local oscillator signal is swept over a frequency bandwidth sufficient to include said actual passband of said bandpass filter.

21. The receiver of claim 15, wherein during said calibration mode, said local oscillator signal is swept from a first frequency to a second frequency, said actual passband of said bandpass filter within a bandwidth defined by said first frequency and said second frequency.

22. The receiver of claim 15, wherein at least one of said first mixer, said second mixer, and said bandpass filter includes differential inputs and differential outputs.

23. The receiver of claim 15, wherein said first mixer, said second mixer, and said bandpass filter are differential.

24. The receiver of claim 15, wherein said first mixer and said second mixer are disposed on a common substrate.

25. The receiver of claim 24, wherein said bandpass filter is disposed external to said common substrate.

26. A receiver for processing an RF input signal having a plurality of channels, comprising:
    a receiver input configured to receive said RF input signal having said plurality of channels;
    a first mixer having a first input coupled to said receiver input and a second input coupled to a first local oscillator signal;
    a bandpass filter having an actual passband and an input coupled to an IF output of said first mixer;
    a programmable gain amplifier (PGA) having an input coupled to an output of said bandpass filter;
    a second mixer having a first input coupled to an output of said programmable gain amplifier and an second input coupled to a second local oscillator signal;
    a detector circuit that detects a signal level at an output of said PGA and controls a gain of said PGA based on said signal level;
    an LO control circuit that adjusts a frequency of said first local oscillator signal based on (1) a selected channel of said plurality of channels, and (2) the actual passband of said bandpass filter determined during a calibration mode, wherein said first input of said first mixer receives no signal during said calibration mode, said first local oscillator signal provided to said bandpass filter during said calibration mode via a leakage path from an LO port to said IF output of said first mixer.

27. The receiver of claim 26, wherein said frequency of said first local oscillator signal is swept during said calibration mode, and said detector circuit detects said signal level at said output of said PGA responsive to said first local oscillator signal to determine said passband of said actual bandpass filter.

28. The receiver of claim 26, wherein said LO control circuit adjusts said frequency of said first local oscillator signal so that said selected channel of said plurality of channels falls in said actual passband of said bandpass filter.

29. The receiver of claim 27, wherein said actual passband of said bandpass filter is at most 2 channels wide.

30. The receiver of claim 26, wherein said first mixer and said second mixer are differential.

31. The receiver of claim 30, wherein said first mixer and said second mixer are disposed on a common integrated circuit substrate, and said bandpass filter is disposed external to said common integrated circuit substrate.

32. The receiver of claim 30, wherein said second mixer is an image rejection mixer.

* * * * *

UNITED STATES PATENT AND TRADEMARK OFFICE
CERTIFICATE OF CORRECTION

| | | |
|---|---|---|
| PATENT NO. | : 7,702,306 B2 | Page 1 of 1 |
| APPLICATION NO. | : 10/649807 | |
| DATED | : April 20, 2010 | |
| INVENTOR(S) | : Donald G. McMullin et al. | |

It is certified that error appears in the above-identified patent and that said Letters Patent is hereby corrected as shown below:

In column 8, line 49, replace "down-converted" with --down-convert--.

In column 8, line 65, replace "coupled an" with --coupled to an--.

In column 9, line 18, replace "passband of actual bandpass filter" with --passband of said bandpass filter--.

In column 9, line 29, replace "passband of said actual bandpass filter" with --passband of said bandpass filter--.

In column 10, line 31, replace "said passband of said actual bandpass" with --said actual passband of said bandpass--.

Signed and Sealed this

Seventh Day of September, 2010

David J. Kappos
*Director of the United States Patent and Trademark Office*